Figure 1:
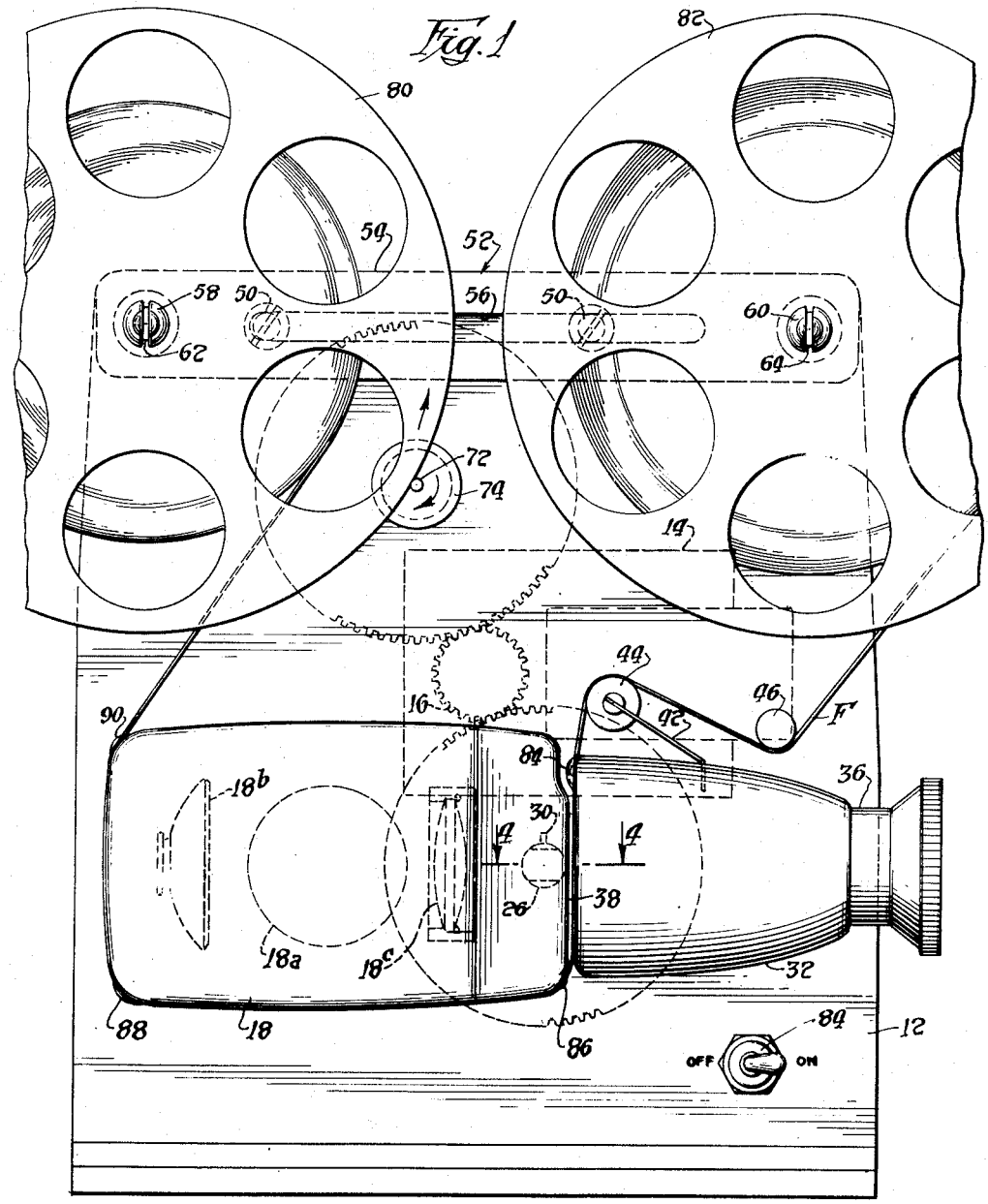

Aug. 4, 1953　　　　O. R. NEMETH　　　　2,647,435
MOTION-PICTURE PROJECTOR

Filed May 2, 1950　　　　　　　　　　　　2 Sheets-Sheet 1

INVENTOR.
Otto R. Nemeth,
BY
Wilfred E. Lawson
Attorney.

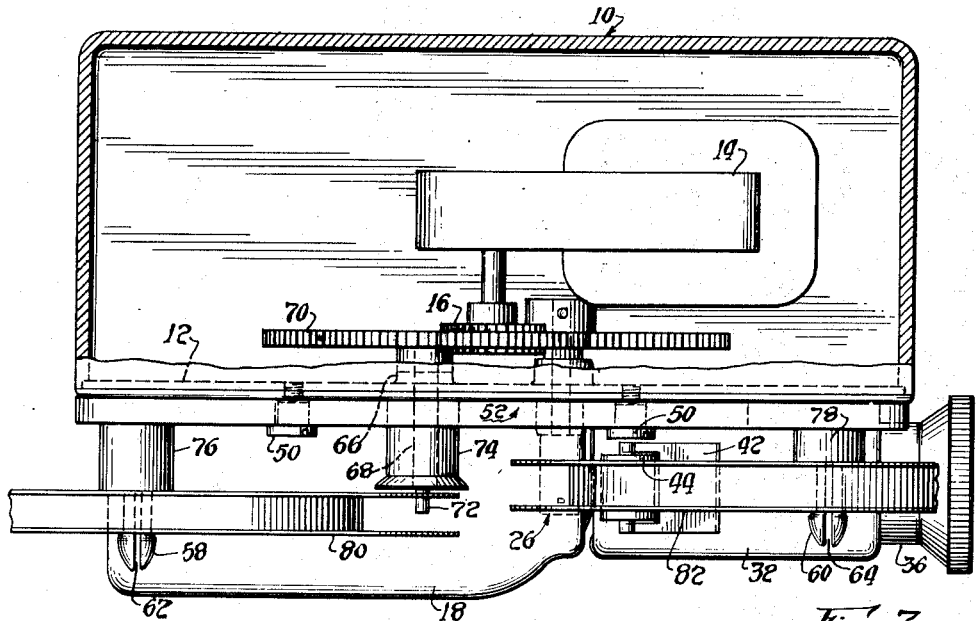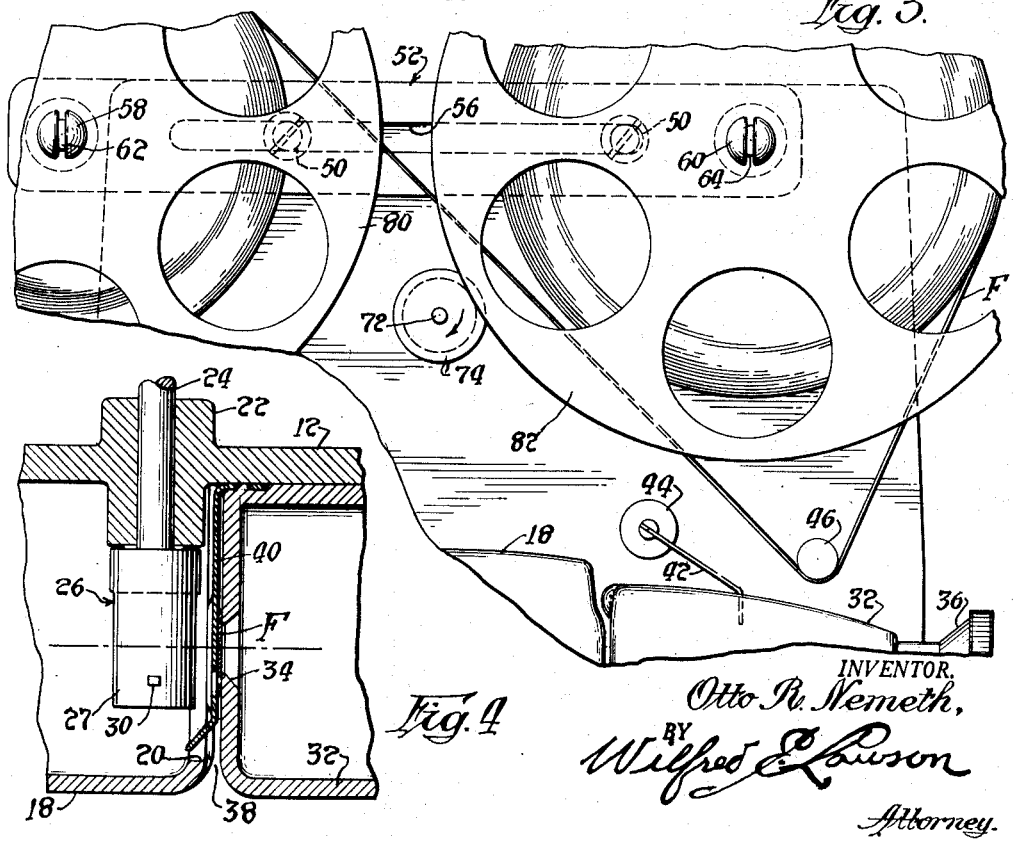

Patented Aug. 4, 1953

2,647,435

UNITED STATES PATENT OFFICE 2,647,435

MOTION-PICTURE PROJECTOR

Otto R. Nemeth, Los Angeles, Calif.

Application May 2, 1950, Serial No. 159,400

4 Claims. (Cl. 88—18)

This invention relates to a motion picture projector and has for its primary object to produce a projector which is efficient, and inexpensive to manufacture.

Another object is to reduce to a minimum the number of moving parts required properly to project motion pictures, thereby reducing the cost of production of motion picture projectors.

Another object is to enable the film which has been projected to be easily and quickly rewound on the rewinding reel by the simple engaging and disengaging of the periphery of the reel with a driving element.

A still further object is to maintain the film during its projection under proper and necessary tension and to drive the take up reel for the film in a manner that will avoid producing excess tension in the film.

The above and other objects may be attained by employing this invention which embodies among its features a support carrying a lamp house and a lens housing in such a position as to form a narrow passage between said housings through which the film is passed during its projection, means in the lamp house adjacent the passage for intermittently engaging the film to advance it step by step through the passage, and means carried by the support and engaging the periphery of the take up roll of the film and connected with the film advancing means to drive the take up roll as the film advancing means rotates.

Still other features include spaced lugs carried by the lamp house for guiding the film therearound during its projection and shiftable means mounted above the lamp house for moving the reels on which the film is supported into or out of an engagement with the reel driving means.

Still further features include a stepped driving means, one portion of which engages one of the reels during the projection of the picture on the film for rotating said reel to take up the film after its projection, and the other step on the reel driving means engaging the rewinding reel during the rewinding of the film.

Figure 5:
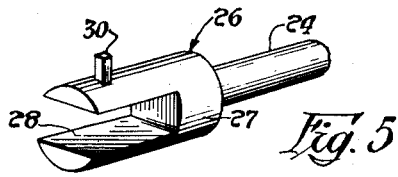

In the drawings:

Figure 1 is a side view of a motion picture projector embodying the features of this invention, Figure 2 is a top plan view of the projector illustrated in Figure 1 showing a portion of the top of the housing broken away more clearly to illustrate certain details of construction, Figure 3 is a fragmentary side view similar to Figure 1 showing the position of the reels, and film during the rewinding operation, Figure 4 is a horizontal sectional view taken substantially along the line 4—4 of Figure 1, Figure 5 is a perspective view of the shutter employed in connection with this projector.

Referring to the drawings in detail a housing designated generally 10 is provided with a vertical side wall 12, and contained within the housing is a conventional drive motor 14 which is connected through a suitable gear train 16 with the rotary barrel type shutter of the projector which will be more fully hereinafter described. Mounted on the vertical side wall 12 of the housing 10 is a lamp house 18 containing conventional light projecting apparatus which includes a lamp 18a, a reflector 18b, and a condensing lens 18c. The end of the lamp house 18 adjacent the condensing lens 18c is provided with a window 20 through which light projected by the light projecting apparatus is directed. Mounted in a suitable bearing 22 carried by the wall 12 is the spindle 24 of a rotary barrel type shutter designated generally 26. This shutter comprises a cylindrical body 27 through one end of which opens a light emitting slot 28, and extending radially from the body 27 midway between opposite sides of the slot 28 is a lug or tooth 30 which as the body 27 is rotated about its longitudinal axis passes out through the window 20 and engages a film which lies adjacent said window as will be more fully hereinafter described.

Mounted on the wall 12 in axial alignment with the lamp house 18 is a lens housing 32 which is provided in its end adjacent the lamp house 18 with a picture framing opening 34. The opposite end of the lens housing 32 is provided with an opening which aligns with the opening 34 and has mounted therein a suitable sleeve 36 containing a focusing lens system by which an image projected through the picture framing opening 34 may be brought into proper focus on a screen in front of the projector.

As illustrated in the drawings the end of the lens housing 32 carrying the picture framing opening 34 is placed in closely spaced relation to the end of the lamp house 18 having the light emitting opening 20 therein to form a passage 38 through which the film is guided during its projection. Carried by the lens housing 32 is a leaf spring 40 which overlies the end thereof adjacent the lamp house 18 and is operable within the passage 38 to hold a film which is being projected closely against the outer face of the end of the lens housing in the immediate vicinity of the picture framing opening 34. Mounted on a resilient arm 42 above the top of the lens housing 32 is a tension roller 44, and mounted on the vertical wall 12 near the tension roller 44 is a guide roller 46 over which the film passes both during the projection, and the rewinding operation thereof.

Mounted for longitudinal sliding movement on spaced screws 50 carried by the vertical side wall 12 above the lamp house 18 and lens housing 32 is a carriage designated generally 52 which comprises an elongated body 54 having an elongated longitudinal slot 56 extending therethrough which receives the shanks of the screws 50 to support the carriage 52 for horizontal sliding movement on the wall 12. Carried by the carriage adjacent opposite ends thereof are spindles 58 and 60 which project horizontally from the side of the body 54 remote from the wall 12 and lie in spaced parallel relation. These spindles are provided adjacent their ends remote from the carriage 52 with bifurcations 62 and 64 respectively which enable the heads of the spindles to contract when mounting or demounting reels thereon.

Mounted in a suitable bearing 66 carried by the wall 12 between the carriage 52 and the lamp house 18 is a spindle 68 which projects horizontally through the wall 12 in parallel relation to the reel mounts 58 and 60.

A drive pinion 70 is secured to the end of the spindle 68 which extends into the housing 10 and meshes with the gear train 16 previously referred to, so that when the shutter 26 is rotated, the spindle 68 will turn in unison therewith. Formed at the extreme end of the spindle 68 remote from the drive pinion 70 is a cylindrical extension 72 which forms a friction drive for one of the reels to be more fully hereinafter described, and surrounding the spindle inwardly of the extension 72 is a cylindrical drive element 74 which under certain conditions engages the rewind reel to be more fully hereinafter described. Surrounding the reel spindle 58 which carries the take up reel of the device is a spacer 76, the end of which remote from the carriage 52 lies slightly beyond the plane of the outer end of the drum 74. A similar spacer 78 surrounds the spindle 66 which supports the rewinding reel of the machine, but it is to be noted that the end of the spacer 78 remote from the carriage 52 terminates in a plane which intersects the drum 74 substantially midway between its opposite ends. By this arrangement of the spacers 76 and 78, reels 80 and 82 are supported in laterally offset relation on the spindles 60 and 68, so that the periphery of the reel 80 mounted on the spindle 58 with the carriage shifted to the right as illustrated in Figure 1, will engage the extension 72 on the spindle 68, so that as the spindle 68 is rotated, the reel 80 will be frictionally driven. On the other hand when the carriage 52 is shifted to the left when viewed as in Figure 1, the periphery of the reel 82 mounted on the spindle 60 will contact the drum 74 and be driven thereby.

In order to control the operation of the motor 14 a suitable switch 84 is mounted on the wall 12 below the lens housing 32, and this switch is connected in circuit with the windings of the motor 14 so that its operation may be controlled by the switch 84. In the preferred form of the invention the switch 84 is also electrically connected with the light source 18a contained in the lamp house 18. Formed on the lens housing 32 adjacent the top thereof and projecting into the passage 38 are lugs 84 which serve as guides between which a film passing over the roller 44 is guided into the passage 38. Similar lugs 86 are carried at the bottom of the lamp house 18 at the end thereof adjacent the passage 38 and serve as guides for the film as it passes below the lamp house. Similar spaced lugs 88 are formed at the lower corners of the lamp house remote from the passage 38 and these lugs cooperate with lugs 90 carried by the upper corner of the lamp house remote from the passage 38 in guiding a film around said lamp house.

In operation the reel 82 containing the film to be projected is mounted on the spindle 60 of the carriage 52 and the film is threaded downwardly beneath the guide roller 46 and over the top of the yielding roller 44 from whence it passes downwardly through the passage 38 and around the lamp house as illustrated in Figure 1 to the takeup reel 80 mounted on the reel supporting spindle 58. With the carriage 52 in the position illustrated in Figure 1, the periphery of the reel 80 will be in contact with the cylindrical extension 72 on the spindle 68, so that as the motor 14 is energized and the shutter 26 rotates, the reel 80 will be driven by frictional contact with the extension 72. Obviously with the lamp 18a illuminated, the light therefrom will be condensed by the reflector 18b and the condensing lenses 18c to be projected through the window 20 and through the lens housing 32 and focusing lens 36 onto a distant screen. With a film F threaded through the machine as previously described it will be evident that the motor will rotate the shutter 26 to intermittently permit the light from the lamp 18a to be projected through the slot 28 therein, as simultaneously with the rotation of the shutter 26, the lug 30 carried thereby will intermittently contact the notches in the film to intermittently advance the film through the slot. Simultaneously the cylindrical extension 72 on the spindle 68 will drive the reel 80 to take up the film which has been through the passage 38. Upon completion of the projection of the picture on the film, the rewinding of the film on the reel 82 may be accomplished by removing the film from the passage 38 and around the lamp housing 18 so that upon rotation of the reel 82 in a counterclockwise direction the film will be rewound on the reel 82. In order to transmit power to the reel 82 for the rewinding of the film, the carriage 52 is shifted as illustrated in Figure 3 so that the periphery of the reel 82 will contact the drum 74 and be driven thereby. The shifting of the carriage 52 of course moves the periphery of the reel 80 out of contact with the extension 72 so that the reel 80 will be free to rotate under the influence of the pull exerted on the film F by the rewinding operation. Obviously owing to the fact that neither of the reels 80 nor 82 is positively driven, it will be evident that danger of tearing the film or unduly stretching it will be avoided both during the projection and the rewinding thereof.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a motion picture projector, a support, a lamp house carried by the support, a focusing lens carried by the support in closely spaced relation to the lamp house to form a guide passage for the film to be projected, means in the lamp house adjacent the guide passage for engaging the film to be projected and moving said film through the guide passage, an elongated carriage mounted on the support for longitudinal movement, spaced parallel reel mounts on the carriage one supporting a film take up reel and the other a film rewind reel, and friction drive means carried by the support between the reels and connected with the film moving means to be engaged by the periphery of one or the other of said reels when the carriage is moved and causing the reel so engaged to rotate and wind the film thereon.

2. In a motion picture projector, a support, a lamp house carried by the support, a focusing lens carried by the support in closely spaced relation to the lamp house to form a guide passage for the film to be projected, means in the lamp house adjacent the guide passage for engaging the film to be projected and moving said film through the guide passage, an elongated carriage mounted on the support for longitudinal movement, spaced parallel reel mounts on the carriage one supporting a film take up reel and the other a film rewind reel, means carried by the carriage for supporting said reels in laterally offset relation, and friction drive means carried by the support between the reels and connected with the film moving means to be engaged by the periphery of one or the other of said reels when the carriage is moved and causing the reel so engaged to rotate and wind the film thereon.

3. In a motion picture projector, a support, a lamp house carried by the support, a focusing lens carried by the support in closely spaced relation to the lamp house to form a guide passage for the film to be projected, a rotary barrel type shutter mounted in the lamp house adjacent the guide passage, means projecting radially from said shutter for engaging the film and moving it through said guide passage, an elongated carriage mounted on the support for limited longitudinal movement, spaced parallel reel mounts on the carriage, a film take up reel mounted for rotation on one of said reel mounts, a film rewind reel mounted for rotation on the other reel mount, and rotary friction drive means carried by the support between the reels to be engaged by the periphery of one or the other of said reels upon longitudinal movement of the carriage whereby the reel so engaged will be rotated to wind the film thereon.

4. In a motion picture projector, a support, a lamp house carried by the support, a focusing lens carried by the support in closely spaced relation to the lamp house to form a guide passage for the film to be projected, a rotary barrel type shutter mounted in the lamp house adjacent the guide passage, means projecting radially from said shutter for engaging the film and moving it through said guide passage, an elongated carriage mounted on the support for limited longitudinal movement, spaced parallel reel mounts on the carriage, a film take up reel mounted for rotation on one of said reel mounts, a film rewind reel mounted for rotation on the other reel mount, resilient means carried by the reel mounts for removably securing said reels, and stepped rotary friction drive means carried by the support between the reels, said stepped rotary means being alternately engaged by the peripheries of said reels upon longitudinal movement of the carriage whereby the reel so engaged will be rotated to effect the winding and rewinding of the film.

OTTO R. NEMETH.

References Cited in the file of this patent

UNITED STATES PATENTS

| Number | Name | Date |
|---|---|---|
| 1,249,376 | Gilmore | Dec. 11, 1917 |
| 1,562,283 | Beck | Nov. 17, 1925 |
| 1,691,414 | Thornton | Nov. 13, 1928 |
| 1,839,315 | Hoover | Jan. 5, 1932 |
| 1,944,029 | Foster | Jan. 16, 1934 |
| 1,997,642 | Klein | Apr. 16, 1935 |
| 2,408,320 | Kuhlik | Sept. 24, 1946 |

FOREIGN PATENTS

| Number | Country | Date |
|---|---|---|
| 306,126 | Great Britain | May 23, 1930 |